Feb. 24, 1931.   L. T. FREDERICK   1,793,603
DIE FOR MOLDING MICA RINGS
Filed June 13, 1928
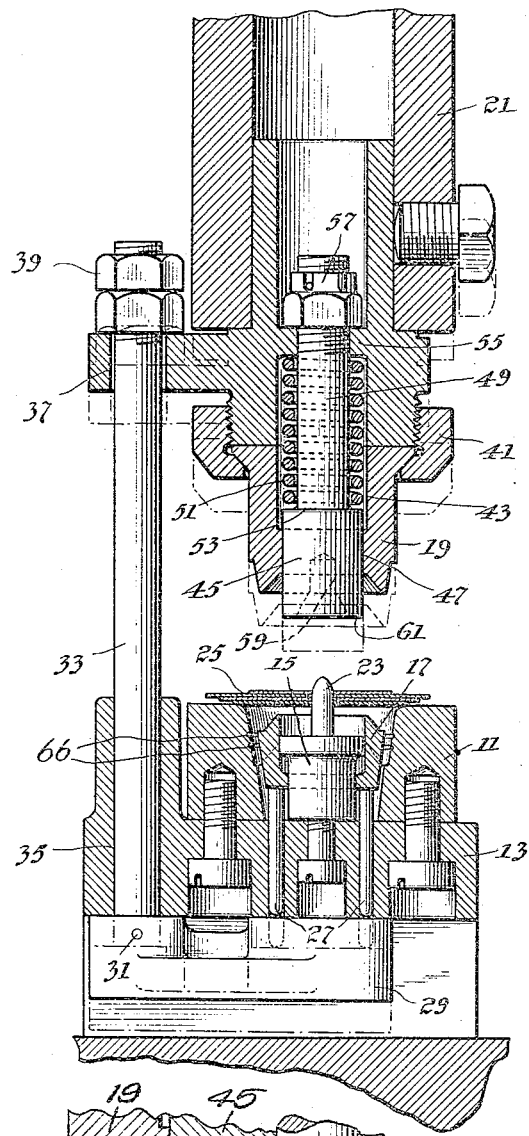
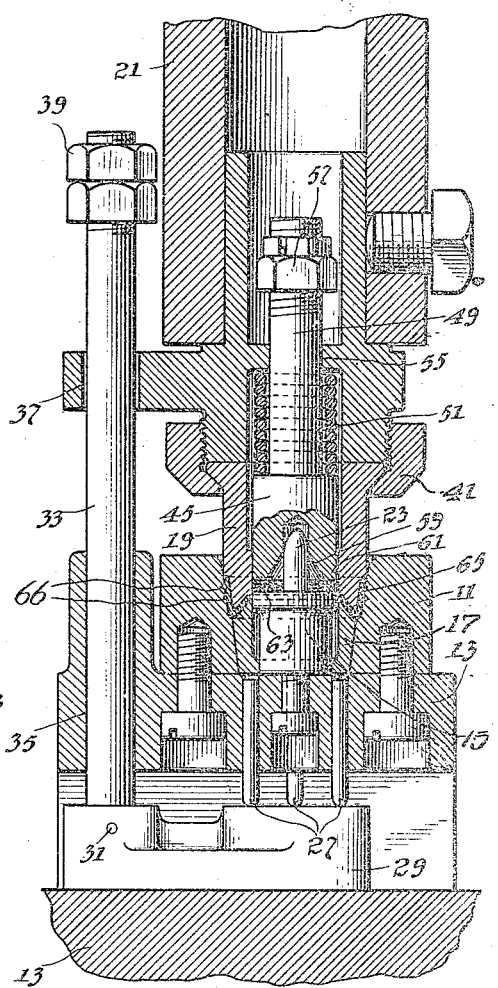
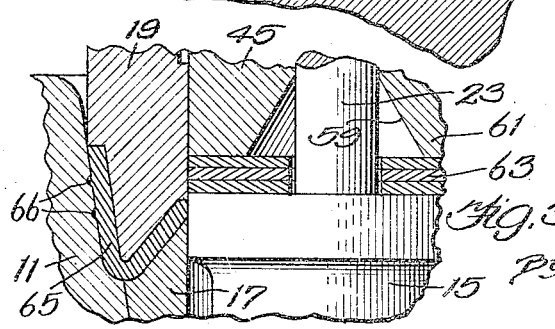
Inventor
Louis T. Frederick
By Cheever + Cox
Attys.

Patented Feb. 24, 1931

1,793,603

UNITED STATES PATENT OFFICE

LOUIS T. FREDERICK, OF VALPARAISO, INDIANA, ASSIGNOR, BY MESNE ASSIGNMENTS, TO CONTINENTAL DIAMOND FIBRE COMPANY, OF NEWARK, DELAWARE, A CORPORATION OF DELAWARE

DIE FOR MOLDING MICA RINGS

Application filed June 13, 1928. Serial No. 284,933.

My invention relates in general to apparatus for producing articles from sheets of semi-plastic material and has more particular reference to a machine for forming articles such as insulating rings for the commutators of dynamo-electric machines. Specifically, my invention resides in providing certain improvements in the apparatus forming the subject matter of my co-pending application Serial No. 147,710, filed November 11, 1926, whereby the operation of the said apparatus is improved so that formed objects may be produced more easily and surely, and my present application forms a continuation, in part, of my co-pending application aforesaid.

In my aforesaid co-pending application I have shown a device for pressing out insulating rings from a stock of mica discs and one of the objects of my present invention is to provide a novel clamp member whereby the mica discs may be securely held in position in the forming die during the forming operation so that the displacement of the mica discs during the forming operation and the consequent formation of defective objects may be substantially prevented.

Another important object of my invention is to provide, in a die for pressing plastic material, means for retaining the pressed object in the die after the withdrawal of the forming member.

Still another object of my invention is to provide, in a forming die, a resiliently receding clamping member adapted to co-operate with a fixed portion of the forming die to securely clamp material in position in the die during the forming operation in order to prevent the displacement of the material.

Still another object of my invention is to provide, in a die for pressing plastic material, grooves in the walls of the die in position so as to form beads in the sides of the formed article whereby the same may be retained in the die after the retraction of the forming member.

Numerous other objects and advantages of the invention will be apparent from the following description which, taken in connection with the accompanying drawings, discloses a preferred embodiment.

Referring to the drawings:

Figure 1 is a vertical section taken through a forming die embodying my invention, the parts being shown in relatively open position;

Figure 2 is a similar cross section showing the parts in relatively closed, or forming position; and Figure 3 is an enlarged view of portions of the device as shown in Figure 2.

To illustrate my invention I have shown on the drawings a forming die comprising a relatively movable forming member and a relatively stationary member. The relatively stationary member comprises a recessed die 11 suitably mounted to a frame or base 13 and having a core 15 and a receding die portion 17 arranged within the recess. The movable member comprises a projecting die member 19 suitably secured to a vertically reciprocable ram 21 in position to co-operate with the relatively stationary member to form a closing mold upon the downward projecting movement of the ram 21. The recessed die 11 has walls diverging upwardly, thus forming a substantially conical recess or chamber in which the work material may be molded.

The core 15 is secured to the bed plate or frame 13 centrally within the conical recess and is or may be suitably anchored to the bed plate as by the bolt illustrated in the drawings. A receding die portion 17 also is arranged within the conical recess. This die is annular in form and embraces the core, being adapted to slide vertically thereon. When this recessed die is depressed to its lowermost position, as shown in Figure 2, it rests upon the bed plate 13 and in conjunction with the conical recess of the die forms a substantially V-shaped annular groove. The receding die portion 17 is controlled by pins 27 which pass through the bed plate 13 and contact at their upper ends with the underside of the receding die. The lower ends of the pins 27 engage an adjuster block 29 which lies in a suitable groove or channel formed in the bed plate vertically beneath the die 11. The adjuster block is secured as by a pin 31 to the lower end of a rod 33 which extends upwardly through a journal 35 formed in the bed plate 13 and freely engages through an aperture formed in a lug 37 extending from the ram 21. Nuts 39 are threaded to the upper end of the rod 33 above the lug 37 so that a limited movement of the die member 19 relative to the adjusting block 29, is permitted as shown clearly in Figures 1 and 2, since the rod 33 passes freely through the aperture in the lug 37.

The projecting die 19 is secured to the vertically reciprocable member 21 by means of a coupling 41 and is annular in cross section, having an axial channel 43 arranged therein, and the lower annular edge of the member 19 is substantially V-shaped in cross section.

I arrange a plunger 45 centrally within the projecting die 19. This plunger is adapted for vertical movement relative to the die 19 which is suitably formed to provide a journal 47 for this purpose. The plunger is carried by a shaft 49 extending upwardly within the channel 43 and is normally urged downwardly with respect to the die member 19 by means of a spring 51 housed within the channel 43 and engaging at opposite ends a shoulder 53 formed in the plunger and a shoulder 55 formed at the upper end of the channel 43. The shoulder 55 defines a circular opening through which the upper end of the shaft 49 extends and a nut 57 is threaded upon the upper end of the shaft 49 to limit the downward movement of the plunger 45 under the urge of the spring.

The core 15 of the relatively stationary die member is provided with an upwardly projecting central pin 23 which is adapted to engage through apertures formed centrally in the work material 25 in order to center the same above the conical recess of the die member 11 and in position to be molded therein.

It will be apparent that when the ram 21 moves downwardly, the rod 33 and the adjuster block 29 will be allowed to descend under the influence of gravity. The receding portion 15 of the relatively stationary die member will also move downwardly until it seats upon the frame or bed plate 13 as shown in Figure 2. Further depression of the ram will carry the lower surface of the plunger into engagement with the central portions of the moldable material and the plunger will clamp the same against the upper surface of the core member 15, the pin 23 engaging in a cylindrical socket 59 formed centrally in the plunger and the peripheral portion 61 of the lower end of the plunger co-acting with the core member 15 to securely clamp the sheets of moldable material firmly in place. Further downward movement of the ram 21 results in the projecting die member 19 sliding downwardly on the plunger and depressing the outer portions of the discs of moldable material into the V-shaped groove formed by the cooperating portions of the die portions 11 and 17, the inner edge of the die member 19 cooperating with the edge of the core 15 to shear off the outer portions of the moldable material immediately before the outer portions are pressed into the groove. It will be apparent that this construction allows the discs of moldable material to be securely clamped by the co-operation of the plunger and the core before the outer portions 65 are sheared off from the central portions 63. This insures that the preformed discs of moldable material are properly positioned in the mold during the forming operation to the end that the formation of imperfect objects may be eliminated, and the recessed die has one or more shallow annular grooves 66, scarcely more than scratches, formed in its sides. These grooves are positioned in the die to extend adjacent the sides of the molded object when the projecting member 19 is at the limit of its downward projection. As the plastic material is compacted into the recessed die 11 by the forming die 19 the grooves 66 will cause small beads to be formed in the sides of the molded object. These beads engage in the grooves and are sufficiently strong to retain the molded object in the recessed die when the forming die 19 is withdrawn and until the receding die portion 17 operates to eject the object from the recessed die 11.

I have discovered that the percentage of rejected objects, when the forming die of my invention is used to form insulating rings which of necessity must be accurately made, may be appreciably reduced. The cost of making mica products is consequently greatly reduced.

It is thought that the invention and numerous of its important advantages will be apparent from the foregoing description and it will be apparent also that numerous changes may be made in the formation, construction and arrangement of the parts without departing from the spirit and scope of the invention or sacrificing any of its material advantages, the form herein described being merely a preferred embodiment of the invention.

I do not herein claim the novel construction and arrangement of the various parts of the forming die itself, since the same forms the subject matter of my co-pending application, Serial No. 147,710, filed November 11, 1926.

Having thus described my invention what I claim as new and desire to secure by Letters Patent is:

1. In a forming die comprising a die member and a relatively movable cooperating die member, means formed in one of said members for centering a stack of vari-sized sheets thereon, cooperating means mounted in the other of said relatively movable die members and adapted to clamp the sheets in centered position in said first mentioned die member as a part of the molding operation.

2. In a forming die comprising a pair of relatively movable die members adapted to cooperate the mold material therebetween, means formed in one of said die members for centering a stack of vari-sized sheets thereon, the other die member having means adapted to cooperate with the centering means to secure the moldable sheets in centered position thereon as a part of the molding operation of said die members.

3. In a forming die comprising a relatively stationary die member and a relatively movable member adapted to co-operate with said die member to mold material therein, means formed in one of said members for centering a stack of vari-sized sheets therein, a yielding clamping member mounted in said movable member and adapted to co-operate with the centering means of said die member prior to and throughout the molding co-operation of said movable members.

4. In a device for molding plastic sheets, a recessed die provided with a groove, a co-operating relatively movable member for forcing a stack of work sheets into the groove, co-operating means formed and arranged in the die and the relatively movable member, and including a clamping member carried by one of said members whereby to secure the work sheets in centered position between said co-operating die and relatively movable member, during the molding co-operation thereof.

5. In a device for molding plastic sheets, a die member having an annular groove, a relatively movable projecting die adapted to co-operate with said die member to force work sheets into said groove, co-operating means formed and arranged in the die member and projecting die, and including a projection formed in one of said die members and means yieldingly carried in said other die member to co-operate with said projection whereby work sheets may be centered and clamped securely between the dies, during the molding co-operation thereof.

6. In a machine for making insulator rings, a recessed die member having an annular groove and a central portion within said groove, said central portion having a projection formed therein to engage and center perforated sheets in the recessed die, an annular projecting die adapted to co-operate with said recessed die member to form work sheets in said groove and a clamping member resiliently carried by said projecting die in position to co-operate with said central portion and its projection to resiliently secure work sheets in centered position in the die during the forming co-operation of said projecting die and said recessed die member.

7. In a machine for making insulating rings from plastic work sheets, a die comprising a stationary central portion, a depressible annular portion encircling said central portion and a substantially conical peripheral portion adapted to co-operate with said depressible annular portion to provide an annular groove, and an annular projecting die adapted to co-operate with said first mentioned die, said projecting die having an annular portion adapted to force work sheets into said groove, and a yielding depressible member adapted to clamp the work sheets to be molded against said central portion during the forming co-operation of said projecting die and said stationary die member.

8. In a machine of the class described, a recessed die, a receding die which, when depressed, forms an annular groove in conjunction with the recessed die and an annular projecting die for forcing moldable material into said groove to form a molded object, said recessed die being provided with a groove arranged therein opposite the sides of the molded object in position to receive projections formed in the sides of the molded object whereby the molded object may be retained in the groove upon the retraction of the projecting die.

9. In a machine of the class described, a recessed die provided with an annular depression, a projecting die for forcing moldable material into said depression to form a molded object, said recessed die being provided with a groove arranged therein in the sides of the depression in position to receive projections formed in the sides of the molded object whereby the molded object may be retained in the groove upon the retraction of the projecting die.

10. In a machine for molding a stack of superposed plastic sheets of various size, co-operating mold portions adapted to engage opposite ends of the stack to mold the sheets therebetween, a centering means arranged in one of said co-operating portions for centering the sheets in said portion and resilient relatively movable means formed and arranged in the other portion and adapted to co-operate with said centering means to secure the sheets in centered position.

11. In a machine for molding a stack of superposed plastic sheets of various size, co-operating mold portions adapted to engage opposite ends of the stack to mold the sheets therebetween, a centering means arranged in one of said co-operating portions for centering the sheets in said portion and depressible means formed and arranged in the other portion and adapted to co-operate with said centering means to secure the sheets in centered position.

12. In a machine for molding a stack of superposed plastic sheets of various size, co-operating mold portions adapted to engage opposite ends of the stack to mold the sheets therebetween, a centering pin arranged in one of said co-operating portions for centering the sheets in said portion and depressible means formed and arranged in the other portion and adapted to co-operate with said centering pin to clamp the sheets in centered position.

13. In a machine for making insulating rings from plastic work sheets, a die comprising a central portion, a relatively depressible annular portion encircling said central portion and a substantially conical peripheral portion adapted to co-operate with said depressible portion to form an annular groove, and a relatively movable die adapted to co-operate with said first mentioned die, said relatively movable die having an annular portion adapted to force work sheets into said groove and a yielding depressible portion adapted to clamp work sheets against said central portion during the ring forming co-operation of said dies, said annular portion of the relatively movable die being adapted to co-operate with the central portion of said first mentioned die to punch out the centers of the plastic sheets during the molding operation.

14. In a machine for making rings from plastic work sheets, a die comprising a central portion, a depressible annular portion encircling said central portion and a peripheral portion adapted to co-operate with said depressible portion to provide an annular groove, said central portion being provided with means formed therein and adapted to engage the work sheets to center the same in the die, and a relatively movable die member adapted to co-operate with said first mentioned die, said die member having an annular portion adapted to force work sheets into said annular groove of the first mentioned die and a yielding depressible portion arranged to clamp the work sheets in centered position in the first mentioned die, as a part of the ring forming operation.

In witness whereof, I have hereunto subscribed my name.

LOUIS T. FREDERICK.